US008176615B2

(12) United States Patent
Konecnik

(10) Patent No.: US 8,176,615 B2
(45) Date of Patent: May 15, 2012

(54) METHOD FOR SECURING A DEVICE

(76) Inventor: Ernst Konecnik, Nacka (SE)

( * ) Notice: Subject to any disclaimer, the term of this patent is extended or adjusted under 35 U.S.C. 154(b) by 163 days.

(21) Appl. No.: 12/867,388

(22) PCT Filed: Feb. 25, 2009

(86) PCT No.: PCT/US2009/035042

§ 371 (c)(1), (2), (4) Date: Aug. 12, 2010

(87) PCT Pub. No.: WO2009/108649

PCT Pub. Date: Sep. 3, 2009

(65) Prior Publication Data

US 2010/0319179 A1 Dec. 23, 2010

Related U.S. Application Data

(60) Provisional application No. 61/031,098, filed on Feb. 25, 2008.

(51) Int. Cl.
*B23P 11/00* (2006.01)
*E05B 73/00* (2006.01)

(52) U.S. Cl. ............... 29/525.01; 29/525.02; 29/525.11; 70/14; 70/58; 70/232

(58) Field of Classification Search ............... 29/525.01, 29/525.02, 525.11; 70/14, 18, 30, 49, 58, 70/232, DIG. 57; 411/412, 413
See application file for complete search history.

(56) References Cited

U.S. PATENT DOCUMENTS

| | | | | |
|---|---|---|---|---|
| 4,212,175 | A | 7/1980 | Zakow | |
| 5,692,918 | A | 12/1997 | Hill | |
| 5,718,134 | A * | 2/1998 | Chang | 70/233 |
| 5,937,678 | A * | 8/1999 | Kuo | 70/18 |
| 6,622,532 | B2 * | 9/2003 | Hsu | 70/14 |
| 7,565,824 | B1 * | 7/2009 | Gleason | 70/58 |
| 2008/0053168 | A1 * | 3/2008 | Lu | 70/58 |

* cited by examiner

*Primary Examiner* — Jermie Cozart
(74) *Attorney, Agent, or Firm* — Fasth Law Offices; Rolf Fasth

(57) ABSTRACT

The method is for securing a device. Security bolts are into the device. The bolts have openings defined therein. A wire is inserted through openings of each bolt. The wire has a male end and a female end. A male end is inserted into a cavity of the female end to align a cavity of the male end with an opening of the female end. A locking bar of a lock is inserted through the cavity and the opening to lock the male end to the female end. The wire may also be attached to an item so that the device cannot be removed from the item.

5 Claims, 2 Drawing Sheets

METHOD FOR SECURING A DEVICE

PRIOR APPLICATION

This application is a U.S. national phase application based on International Application No. PCT/US2009/035042, filed 25 Feb. 2009, claiming priority from U.S. Provisional Patent Application No. 61/031,098, filed 25 Feb. 2008.

TECHNICAL FIELD

The method relates to a method for securing a device such as an electronic device.

BACKGROUND OF INVENTION

Most electronic devices are at great risk of being stolen since they are often quite expensive and easy to carry. Many attempts have been made to develop systems to secure the devices. Such systems often require that the user must attach, such as by gluing or drilling, something to the device. One problem is that any such modification to the device often voids any warranty provided by the manufacturer. There is a need for an effective way of securing electronic devices and other devices to prevent theft while maintaining the warranty provided by manufacturers.

SUMMARY OF INVENTION

The method of the present invention provides a solution to the above-outlined problems. More particularly, the method is for securing a device without voiding any manufacturer warranties. Screws are removed from the device and replaced by security bolts that are inserted or screwed into the device. The bolts have openings defined therein. A wire is inserted through openings of each bolt. The wire has a male end and a female end. A male end is inserted into a cavity of the female end to align a cavity of the male end with an opening of the female end. A locking bar of a lock is inserted through the cavity and the opening to lock the male end to the female end. The wire may also be attached to an item so that the device cannot be removed from the item.

DETAILED DESCRIPTION

Figure 1:
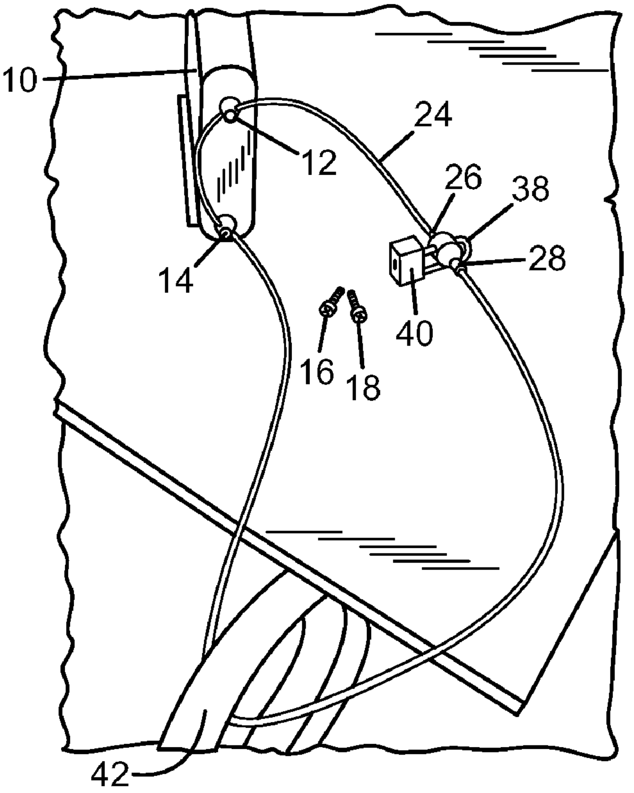
FIG. 1 is a perspective view of an electronic device having a wire extending through safety bolts screwed into the device.

FIG. 1 shows an electronic device 10 that has two security bolts 12, 14 screwed into the device. The electronic device could be any device such as a hard disk, plasma TV or any other device that is worth stealing. The security bolts 12, 14 replace the conventional screws 16, 18 that have been unscrewed from the device 10. Each bolt 12, 14 has an opening 20 defined therein for receiving a bendable wire 24 that is inserted through the openings 20. Preferably, the wire 24 fit snugly inside the opening 20. It is important that at least two bolts 12, 14 are used so that the bolts cannot un-screwed from the device 10 without first removing the wire 24.

Figure 2:
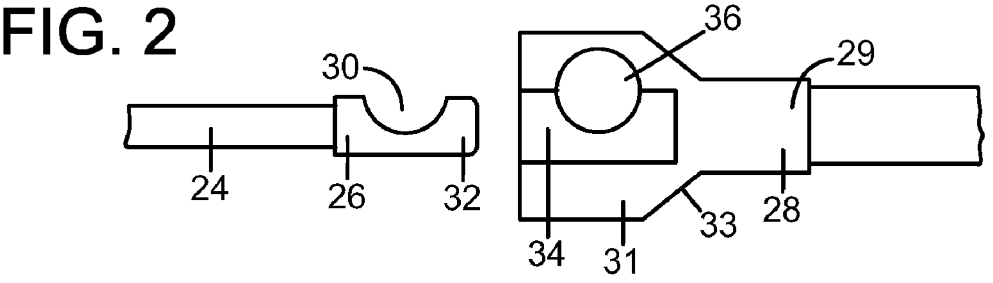
FIG. 2 is a detailed view of the male and female ends of the wire.
Figure 3:
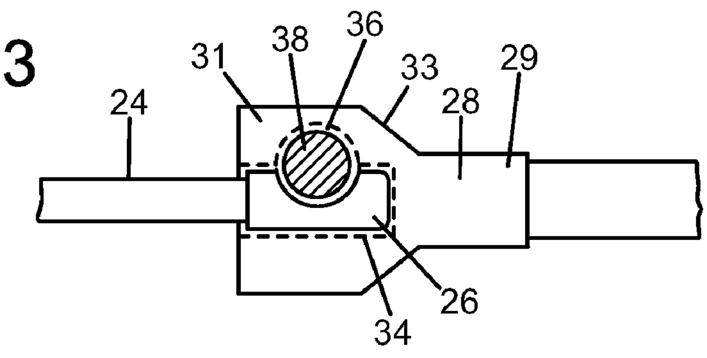
FIG. 3 is a detailed view of the male end inserted into the female end of the wire.

As best shown in FIGS. 2-3, the wire 24 has a male end 26 and a female end 28 attached to each end of the wire 24. The male end 26 may be cylindrical shaped and have a half-circle cavity 30 defined therein close to an outer end 32 of the male end 26.

The female end 28 has a narrow portion 29 and a widened portion 31 with a chamfered or sloping surface 33 that extend to the narrow portion 29. The female end 28 has a cylindrical shaped cavity 34 defined therein. Preferably, the cavity 34 is centered with the wire 24 and is dimensioned to receive the male end 26. The female end 28 has a transverse off-centered opening 36 defined therein. The opening 36 is dimensioned so that when the male end 26 is fully inserted into the cavity 34 the half-circle cavity 30 is aligned with the off-centered opening 36, as best shown in FIG. 3.

When the male end 26 is inserted into the cavity 34 so that the cavity 30 is aligned with the opening 36 then a locking bar 38 of a lock 40 may be inserted therethrough. Because the bar 38 extends both through the cavity 34 and the opening 36 the male end 26 is locked to the female end 28 and the male end 26 cannot be pulled out because the cavity 30 is hooked to the looking bar 38. Also, because the device 10 is attached to the bolts 12, 14 that have the wire 24 extending therethrough the device 10 is secured to an item, for example, a chair 42, as best shown in FIG. 1.

Figure 4:
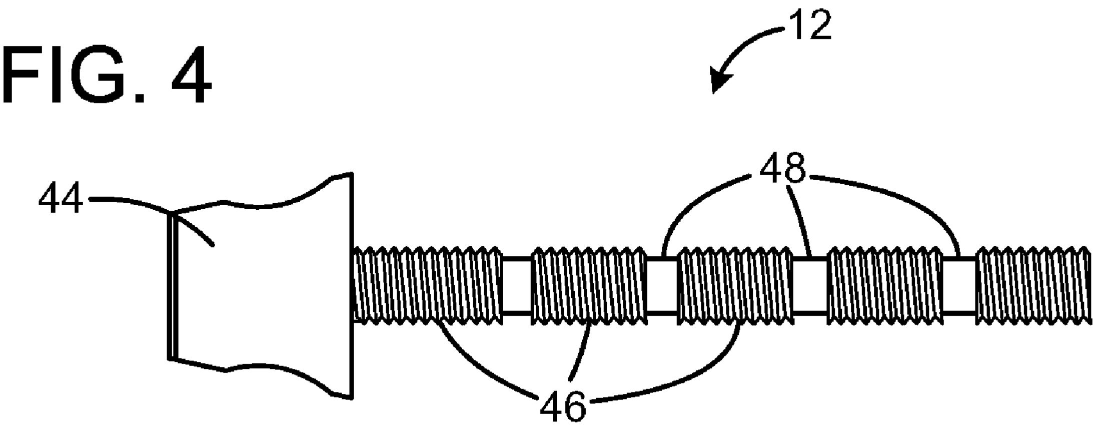
FIG. 4 is a side view of a safety bolt.
Figure 5:
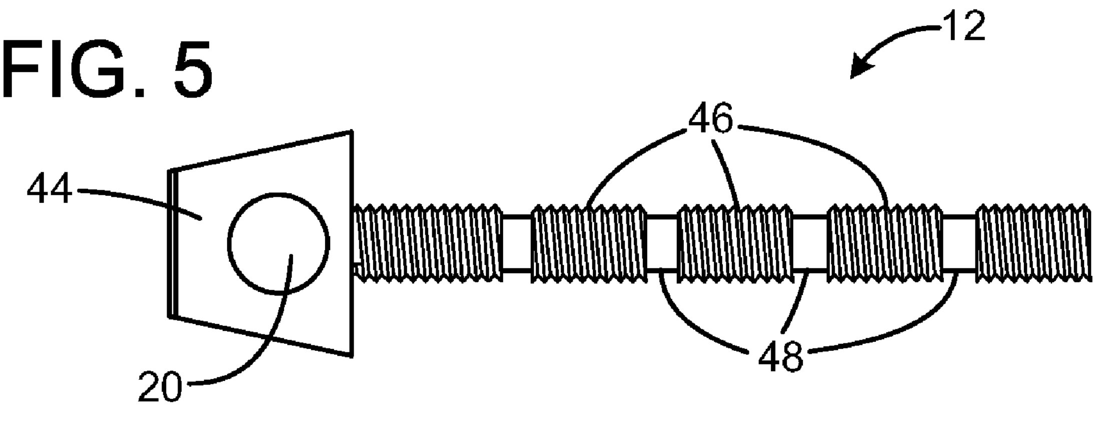
FIG. 5 is another side view of the safety bolt shown in FIG. 4.

FIGS. 4-5 show detailed view of the universal safety bolt 12. The safety bolt 14 is preferably identical to the bolt 12. The bolt 12 has an enlarged head 44 that has the opening 20 defined therein and extending therethrough. The head 44 preferably has a conical shape to make it harder to turn the bolt by using a tool or a saw to cut since the tool may slide on the head 44. The bolt has a segmented threaded section 46 with grooves 48 disposed between each threaded section 46 so that the user can easily cut or saw the bolt to a suitable length. The grooves 48 are carefully located so that by cutting at one of the grooves the length of the bolt will be the same length as the length of commonly used screws. Preferably, the length of the bolt 12 should be about the same as the original screws 16, 18 that were removed from the device 10.

If the user needs to remove the device 10, the user simply unlocks the lock 40 and pull out the bar 38 so that the male end 26 can be separated from the female end 28. The wire 24 is then pulled through the openings of the bolts 12, 14 and the device 10 can be removed from the chair 42. If the device 10 breaks down and the user would like to have the device 10 returned to or repaired by the seller, then the user simply unscrews the bolts 12, 14 and replaces them with the conventional screws 16, 18 so that the device 10 is eligible for warranty service.

While the present invention has been described in accordance with preferred compositions and embodiments, it is to be understood that certain substitutions and alterations may be made thereto without departing from the spirit and scope of the following claims.

The invention claimed is:

1. A method for securing a device, comprising:

providing a device to be secured;

unscrewing conventional screws from the electronic device and replacing with security bolts;

attaching the security bolts into the device;

the bolts having openings defined therein;

inserting a wire through openings of each bolt;

the wire having a male end and a female end;

inserting the male end into a cavity of the female end to align a cavity of the male end with an opening of the female end; and inserting a locking bar through the cavity and the opening to lock the male end to the female end;

the device breaking down; and unscrewing the security bolts from the device and replacing with the conventional screws.

2. The method according to claim 1 wherein the method further comprises attaching the wire to an item.

3. The method according to claim 1 wherein the method further comprises locking the locking bar of a lock.

4. The method according to claim 1 wherein the method further comprises adjusting a length of the security bolts to a length of the screws.

5. The method according to claim 4 wherein the method further comprises cutting the security bolts to a predetermined length at a groove disposed between threaded sections.

* * * * *